United States Patent
Grunewald

(10) Patent No.: US 7,752,696 B2
(45) Date of Patent: Jul. 13, 2010

(54) DOCKING BUFFER

(76) Inventor: Niclas Grunewald, Schluterstrasse 2, 20146 Hamburg (DE)

(*) Notice: Subject to any disclaimer, the term of this patent is extended or adjusted under 35 U.S.C. 154(b) by 0 days.

(21) Appl. No.: 12/115,973

(22) Filed: May 6, 2008

(65) Prior Publication Data
US 2008/0201875 A1    Aug. 28, 2008

Related U.S. Application Data

(62) Division of application No. 10/543,929, filed on May 10, 2006.

(51) Int. Cl.
*E01D 1/00* (2006.01)
(52) U.S. Cl. .............. 14/69.5; 14/71.3; 404/6
(58) Field of Classification Search ......... 14/69.5–71.3; 404/6
See application file for complete search history.

(56) References Cited

U.S. PATENT DOCUMENTS

| | | | | |
|---|---|---|---|---|
| 2,879,985 A * | 3/1959 | Waddell et al. | ............ | 267/139 |
| 3,840,930 A * | 10/1974 | Wanddell | .............. | 14/71.3 |
| 4,293,969 A * | 10/1981 | Frommelt | .............. | 14/71.1 |
| 4,750,299 A * | 6/1988 | Frommelt et al. | ............ | 52/2.13 |
| 5,007,211 A * | 4/1991 | Ouellet | .............. | 52/2.12 |
| 5,205,010 A * | 4/1993 | Hageman | .............. | 14/71.7 |
| 5,564,238 A * | 10/1996 | Ellis | .............. | 52/173.2 |
| 6,006,389 A * | 12/1999 | Alexander | .............. | 14/71.1 |
| 6,329,931 B1 * | 12/2001 | Gunton | .............. | 340/933 |
| 6,497,076 B1 * | 12/2002 | van de Wiel et al. | ....... | 52/173.2 |
| 6,781,516 B2 * | 8/2004 | Reynard et al. | .......... | 340/686.1 |
| 6,832,403 B2 * | 12/2004 | Hahn et al. | .............. | 14/69.5 |
| 6,975,226 B2 * | 12/2005 | Reynard et al. | ............ | 340/540 |
| 7,444,785 B2 * | 11/2008 | Dillon et al. | .............. | 52/173.2 |
| 2001/0039687 A1 * | 11/2001 | Hahn et al. | .............. | 14/71.3 |
| 2003/0145535 A1 * | 8/2003 | DiBiase et al. | ............ | 52/173.2 |
| 2005/0261786 A1 * | 11/2005 | Eager et al. | ................ | 700/17 |

* cited by examiner

*Primary Examiner*—Raymond W Addie
(74) *Attorney, Agent, or Firm*—Lackenbach Siegel, LLP

(57) ABSTRACT

A height-adjustable docking buffer is described for protecting facades when vehicles are docked in building openings. The docking buffer is made up of a fixed mounting frame and a height-adjustable buffer block for a loading ramp or a transfer bridge. The buffer block is designed as an essentially horizontal bumper bar, and includes an inflatable gasket, the ends of which are height-adjustably supported on two spaced, fixed mounting frames, preferably in the form of pillars. A method for operating the docking bar is also disclosed.

18 Claims, 11 Drawing Sheets

DOCKING BUFFER

PRIOR RELATED APPLICATIONS

This patent application is a divisional patent application of U.S. patent application Ser. No. 10/543,929, filed May 10, 2006, which claims priority to and incorporates by reference in its entirety and claims priority to and incorporates by reference in their entireties German patent application Serial No. 103 05 565.7, filed Feb. 10, 2003 and German patent application Serial No. 103 13 268.6, filed Mar. 24, 2003 and PCT patent application, Serial No. PCT/EP2004/001214, filed Feb. 10, 2004.

BACKGROUND

1. Field of the Invention

The invention relates to a height-adjustable docking buffer, particularly for protection during loading and unloading operations for vehicles at building openings, consisting of a mounting frame and a height-adjustable buffer block for a loading ramp or a transfer bridge.

In addition, the invention relates to a process for operating a docking buffer.

Trucks are loaded at warehouses almost exclusively on loading ramps, which should be at approximately the height of the vehicle loading surface. Also known are transfer bridges that enable an adjustment between the level of the loading ramp and the level of the vehicle loading surface, which changes depending upon the loading status.

2. Discussion of the Prior Art

The German Utility Model DE 92 01 381 U1 describes a docking buffer for ramps that adjusts to the upward and downward movements of the vehicle during loading and unloading, and thus prevents damage to the buffer and its means of attachment. In its resting position, i.e. the normal position, this buffer is located at ramp height, and can then be raised or lowered by a truck. In this known configuration, it is not possible to adjust the buffer to a height above or below the ramp. Nevertheless, the situation has repeatedly arisen wherein the ramp height is significantly lower than the height of the vehicle loading surface, with the result that the vehicle overshoots the edge of the ramp and thus in some circumstances damages the building door, building facade, or vehicle. To prevent this, the generic German patent DE 195 48 121 proposes that the buffer block be adjustable in its initial position over the surface of the loading ramp or transfer bridge. Such a docking buffer, which protrudes over the top edge of the ramp, interferes when opening the truck's door. Because the buffer block interferes during the loading process, it must be lowered so that its upper edge is flush with the ramp height, and can no longer obstruct the loading process. The solution to the problem of lowering the buffer when a truck is exerting pressure on the buffer is solved only insufficiently and thus disadvantageously with the state of the art. In the state of the art, when under pressure from the docked vehicle, the buffer can be lowered only by removing a wedge or displacing a cam so as to introduce play into the mechanism and thus enable the buffer to be lowered.

It may also occur, however, that the loading surface of the docking truck is lower than the height of the ramp edge. In such cases, the vehicle and building should also be protected against damage when docking.

A special problem presents itself when, for specific reasons, e.g. temperature controlled logistics chains such as those for refrigerated buildings, no building wall is available to mount a docking buffer. Examples of such devices to seal the gap between the edge of a building opening and the rear of a docked vehicle can be found in DE 33 42 732 A 1, DE 37 10 528 A 1, DE 30 49 358 C 2, DT 25 55 201 A 1, and DE 199 06 486 C 1. All of these devices have in common the fact that they seal the gap only at the sides and the top between the building opening and a vehicle docking at this building opening. At the bottom, the gap between the building opening and the vehicle is only partially sealed by a transfer bridge, whose platform is placed upon the vehicle's loading surface in order to load or unload the vehicle.

The disadvantages of these known concepts is that openings remain between the lateral seals and the transfer bridge, through which air exchange can occur between the outside air and the inside of the loading station. Because of the necessary positional tolerances of a vehicle docking at the building opening, the transfer bridges must always be narrower than the vehicle's loading surface. The aforementioned openings are thus necessitated by the system. These openings constitute a disadvantage, e.g. particularly in the case of logistics chains for deep frozen goods that require maintenance of a specific temperature or a specific climate for the items being transported. Moreover, in the case of refrigerated buildings, the transfer bridges may freeze over because the warm air entering the area condenses existing moisture on the upper surface of the transfer bridge. The resulting dew may also freeze, which presents a hazard to workplace safety. For such situations, GM 7425832.5 or DE 2306130, for example, describe gaskets that seal the gap between the building opening and a docked vehicle above and at the sides. In addition, U.S. Pat. No. 4,293,969 describes an inflatable gasket that forms the seal between a floor of a transfer bridge and the base of the depression.

A disadvantage of the known solutions is that an unsealed opening always remains on either side of the rear end of the vehicle and the transfer bridge.

Nevertheless, there is an urgent need to automate the entire loading process, even for different structural situations, and to improve safety both inside and outside.

SUMMARY OF THE INVENTION

This problem is solved in that the docking buffer is embodied as an essentially horizontal bumper bar with at least one docking bumper positioned in the area of its ends on two spaced, height-adjustable mounting frames, preferably in the form of pillars. In this configuration, the bumper bar preferably extends across the entire building opening. For example, it can be more than twice as wide as a transfer bridge. In its resting position above the bridge plate of the transfer bridge, the bumper bar advantageously also acts simultaneously to prevent loading equipment such as forklifts on the bridge plate from falling, and thus increases workplace safety within the building. The fact that at least one docking bumper is arrayed on an essentially horizontal bumper bar that is positioned on a height-adjustable mounting frame assures workplace safety even in cases where the bridge plate covers the entire width of a truck and the known docking buffers are ineffective.

In these cases, trucks and their rear lights are protected against damage. Thus the bumper bar protects the transfer bridge, the building, and approaching vehicles against damage not only inside, but also outside.

This applies in particular if the bumper bar also has an adjustment track with both a horizontal and vertical distance-regulating component. The horizontal distance-regulating component is used to disengage the docking buffer. The vertical distance-regulating component permits height adjustment. In particular, the embodiment in which the upward displacement path is at a greater distance from the staging level than the downward displacement path in at least one part of the track permits a clear operating sequence to be assigned to the travel paths of the drive elements. Upon startup, therefore, the outward-facing horizontal distance-regulating component will transit first before the vertical displacement occurs. During shutdown, the horizontal distance-regulating, but in this case the inward-facing component, will also transit first and thereby disengage the buffer block, if necessary before the bumper bar is lowered into its lower final position. In the lower position of the bumper bar, there is thus no contact with the vehicle.

The fact that the mounting frame is designed in a fixed manner and that it has a guide template in which two vertically positioned adjustable supporting surfaces support a movable assembly permits an advantageous direct conduction of collision forces that occur in the structure and an especially robust embodiment, particularly when the movable assembly is formed by the docking buffer and one section of the linear drive, and wherein preferably one or both supporting surfaces are arrayed on the buffer block, any buffer forces that occur will be guided through these defined supporting surfaces, which are appropriately large and preferably planar, into the mounting frame. The actuating drive advantageously remains protected against these forces.

Functional safety is further increased by the fact that the buffer block has a carrier opening that is larger in its vertical direction than in its horizontal direction, and in which a carrier element, which is configured so as to grab the opening, is connected to the moving part of the actuating drive. This eases the disengagement of the buffer. The buffer block can advantageously extend far beyond the upper edge of the ramp because a supporting surface exists in the form of a torque bracket for the impact force exerted on the buffer block. The buffer block has an impact surface whose center axis is located above the carrier opening, and as a result of the impact forces, a moment is applied to the structure about a horizontal axis via the mounting frame in this structurally favorable manner.

If the drive of the docking buffer has an active linkage to a control unit, to which the signal of a sensor to detect an approaching vehicle is connected, then the operation of the buffer can be advantageously automated. The control unit extends the docking buffer out of the obstructing range as soon as the sensor signals the presence of a vehicle, and, for example, if a time interval has also expired. As soon as the vehicle then leaves its docking position, the bumper bar is automatically moved into its upper safety position.

The docking buffers can also be advantageously moved out of the pivot range of the truck's back door if the distance between the pillars is greater than the space of the docking bumpers, preferably more than twice the width of a truck.

The impact forces that occur can be advantageously diverted regardless of a building foundation by fastening the lower ends of the pillars to the road surface. Additional structural stability is achieved if the pillars are supported in the area of their upper end by a supporting beam, which in turn is preferably fastened to the road surface and/or a building foundation.

The embodiment of the invention provides for the bumper bar to have a gasket unit, which is preferably adjustable, particularly inflatable, with the gasket unit bridging a gap between the bumper bar and the transfer bridge. In this way, when loading or unloading in the case of a temperature-sensitive logistics chain, a safe seal against external air can be achieved so that no humidity can condense or freeze on the transfer bridge and thus endanger the safe use of equipment such as forklifts or pallet stackers. The gasket unit can have a simple and robust design if the gasket unit is inflatable. Such a gasket unit can also advantageously adjust to external parts on a vehicle so as to provide an especially good seal and not damage the vehicle. Because of its inflatability, the gasket unit can adjust extremely well to differing distances between the bumper bar and the vehicle/transfer bridge caused by different operating conditions and types of vehicle, while additional mechanical drives are not required because the gasket material is pressed into an appropriate shape by the incoming air. The gasket unit thereby advantageously extends across the width of the transfer bridge so that it seals the openings on either side of the transfer bridge to form a three-sided seal against the building opening.

This sealing effect is improved in that the gasket unit is U-shaped as viewed from the top and/or preferably formed with its free legs pointing in the direction of the docking bumper, i.e. in the direction of the truck. In this way, the gasket unit conforms better to the shape of the vehicle. It also forms a seal beyond the lateral edges of the transfer bridge by virtue of the fact that the gasket unit is wider than the transfer bridge.

It is particularly advantageous if the gasket unit is wider than the transfer bridge provided in the building opening. The existing gaps to the right and left of the loading bridge are then sealed. The gasket unit preferably covers the entire width of the building opening. In doing so, the gasket unit can be configured as a scissor-like extension element with motor-driven adjustment and/or a roller-shutter consisting of a series of overlapping blades. Access to the interior area of the loading bay is made significantly more difficult by the fixed roller-shutter consisting of a series of overlapping blades.

The gasket unit can be designed simply and robustly, however, if the gasket unit is inflatable. Such a gasket unit can be advantageously adapted, even to external parts on the vehicle, so that it creates a particularly good seal, does not damage the vehicle and minimizes heat leakage.

Currently existing blowers can be advantageously used for the gasket unit according to the invention if additional gasket units, preferably inflatable gasket units, are arrayed around the building opening so that the building opening is sealed on all sides.

In the embodiment of the invention, air is provided to the gasket unit in that the gasket unit has an air blower with an air supply line for the gasket unit, wherein the blower is especially embodied as a reversible blower. Because the blower is reversible, air can also be quickly removed from the gasket and the vehicle can leave the loading opening.

The startup of the gasket operation can be advantageously automated if the blower is connected to a control unit of the transfer bridge via an active linkage wherein the control unit detects the presence of a truck. For example, the control unit will activate the blower if the transfer bridge is lowered to the loading surface of the docked truck. As soon as the transfer bridge then receives the command to return to its resting position, the blower can be simultaneously switched off, or even switched off in advance, so that the gasket deflates as a result of the air discharging from the air discharge openings. This time can be further shorted if desired by operating the blower in reverse for a short period of time. The gasket then reinflates only when the vehicle is already in its parked position and the transfer bridge is laid onto the loading surface.

Because the start signal for the lower sealing element to approach the sealing position is generated by the control unit, preferably the transfer bridge control unit, only when the operating position of the transfer bridge is reached, particularly after the expiration of a time interval, the sealing of the gap between the building opening and the vehicle occurs largely automatically. This can be achieved in that the control unit automatically issues the signal to inflate after expiration of a preset time after the control unit issues the lowering command.

The gasket unit can also be advantageously deactivated largely automatically if the signal for returning the lower gasket unit into the resting position is generated by the transfer bridge control unit. The command is issued by the control unit, for example, as soon as a preset time has expired since the "lift" button was pressed. This operation can be shortened even further by returning the gasket unit into the resting position through a reversal of the blower. During operation, the loading status of the docked vehicle change. For this reason, the level of the loading surface also changes. The inflatable gasket unit can follow this motion of the vehicle because of its inherent elasticity, and thus maintains contact with the vehicle. The matter is different if a mechanically stable roller-shutter is used as a gasket unit, due to safety reasons for example. In order that the roller-shutter does not suffer any damage and nevertheless maintains contact with the vehicle, a self-activating loading regulator is advantageously provided to automatically adapt the position of the gasket unit to the changing position of the transfer bridge.

The invention is described by a preferred embodiment with reference to a drawing, while additional advantageous details can be seen in the figures of the drawing. Functionally identical parts are referred to by the same reference number.

DESCRIPTION OF A PREFERRED EMBODIMENT

Figure 1:
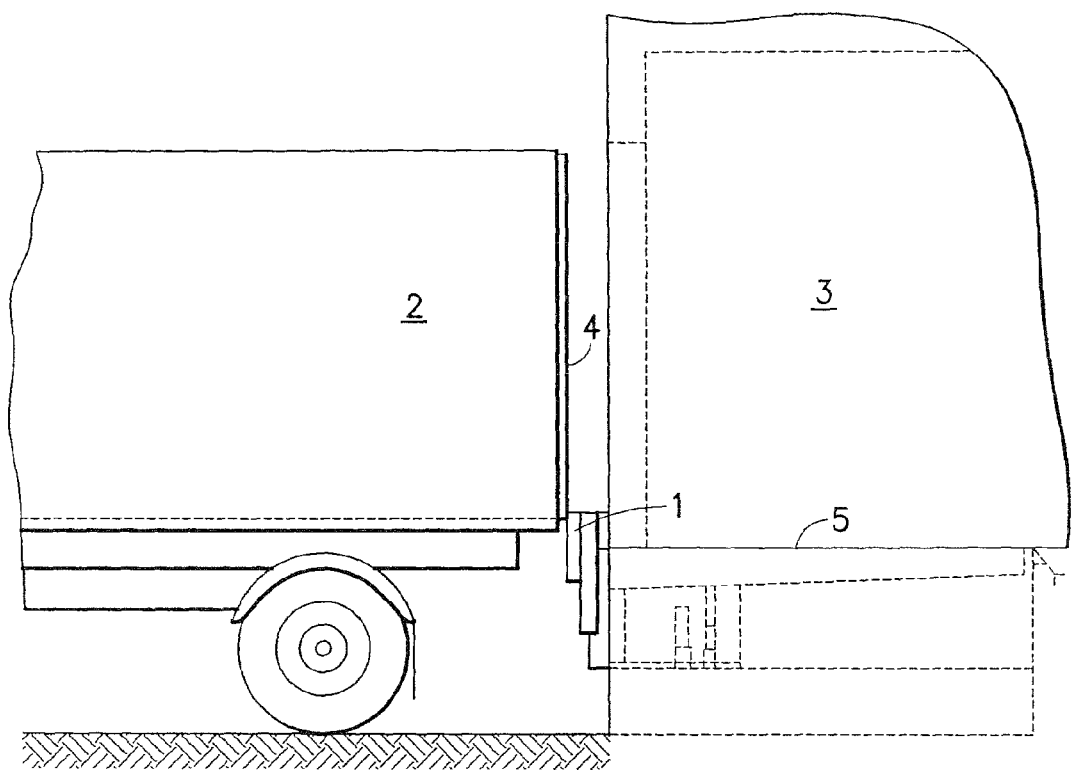
FIG. 1 a side view of the docking buffer according to the invention in a docking situation with a truck, FIG. 2 a side view of the docking buffer according to the invention in a loading situation with a truck, FIG. 3 a schematic cross-section of a side view of the docking buffer according to the invention in the operating position, FIG. 4 a schematic cross-section of a side view of the docking buffer according to the invention in the docking situation for a truck, FIG. 5 a schematic illustration of the displacement path of the docking buffer according to the invention, FIG. 6 a schematic illustration of a top view of the docking buffer according to the invention, FIG. 7 a vertical section through an alternative embodiment with a bumper bar supported on pillars, FIG. 8 a front view of the embodiment pursuant to FIG. 9, FIG. 9 a top view of the embodiment pursuant to FIG. 8, FIGS. 10*a* and 10*b* are front views showing a lock in front of the building opening in resting or operating positions, respectively.
Figure 2:
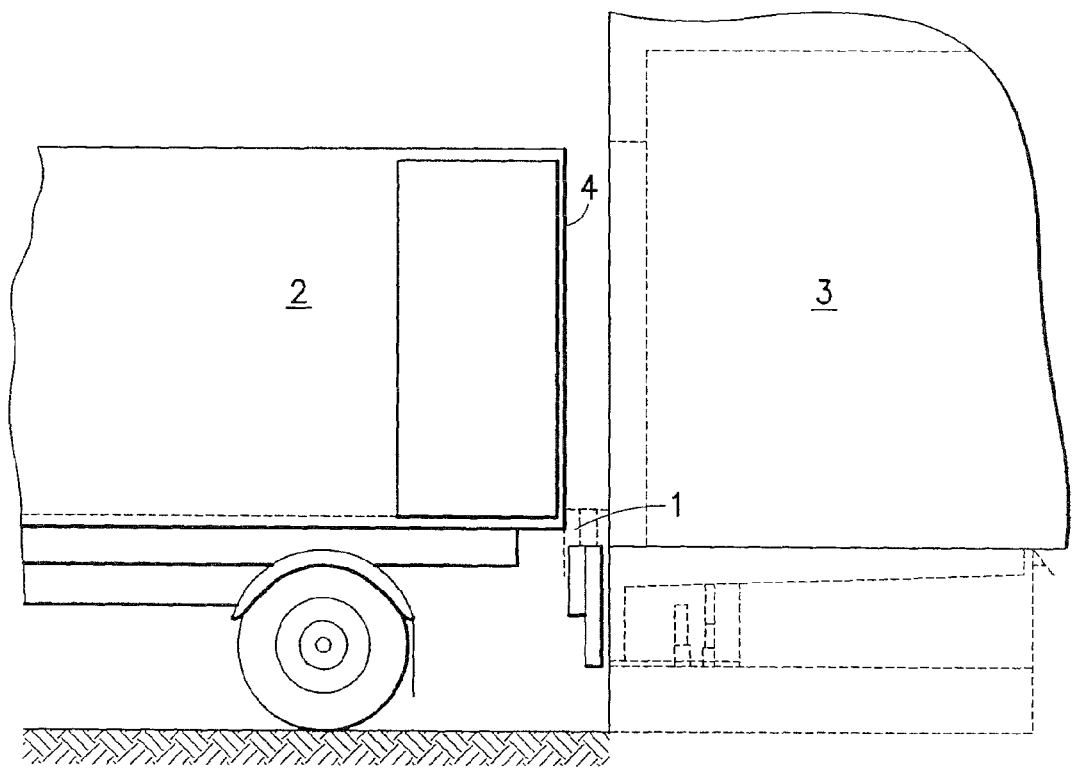

In FIGS. 1 and 2, 1 designates the docking buffer according to the invention, which is arrayed between a truck 2 and a building 3. FIG. 1 shows a situation in which the truck with closed doors 4 initially approaches docking buffer 1. In this process, the upper edge of the docking buffer is positioned so that it extends beyond the level of ramp edge 5. The docking buffer is thereby at a height that is sufficient to permit truck superstructures to be driven against the buffer. The buffer, however, obstructs opening of the doors 4. For this reason, the docking buffer is then moved out of the protective position according to FIG. 1 into the operating position shown in FIG. 2. In this position, the docking buffer no longer collides with the opening doors.

Figure 3:
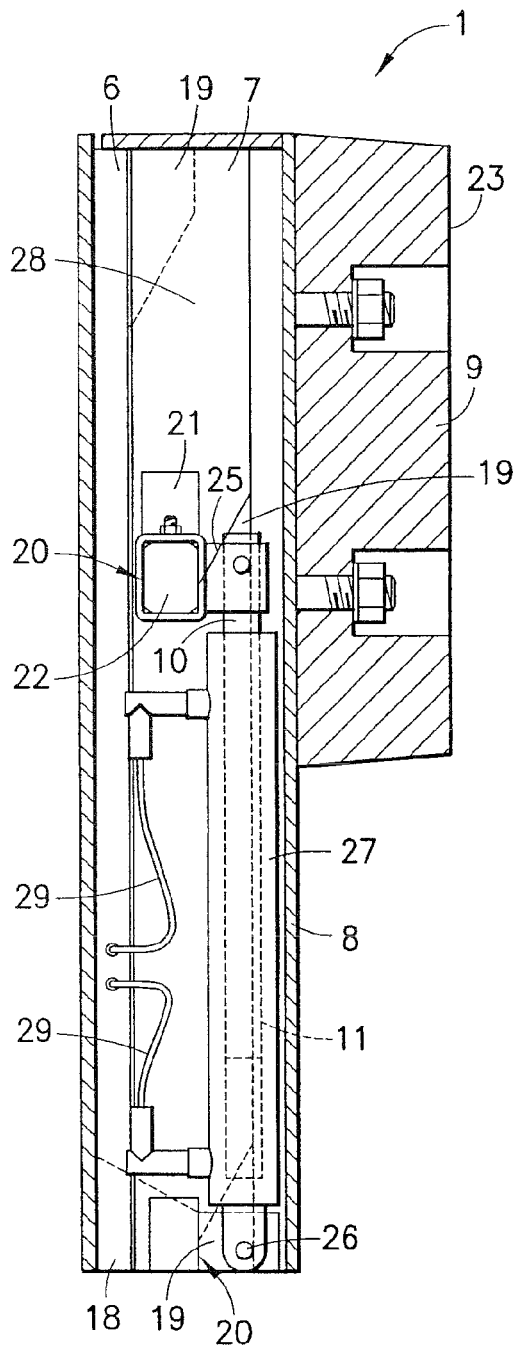

The design of the buffer according to the invention is shown in vertical section in FIG. 3. Docking buffer 1 essentially consists of a fixed assembly 6 and a movable assembly 7.

The movable assembly includes a buffer block 8 to which docking bumper 9 is attached. Piston rod 10 of a piston cylinder drive 11 is pivotingly attached to buffer block 8 by means of a linkage 25 so that buffer block 8 can move. This actuating drive 11 is pivotingly mounted on the other side via pivot position 26 of cylinder 27 on mounting frame 18, which forms fixed assembly 6.

To control the displacement, a guide template 19, consisting of multiple individual elements, is welded onto mounting frame 18. Template 19 guides a carrier element 22, which catches in carrier opening 21 of a plate welded onto buffer block 8. Carrier element 22 is moved by piston rod 10 via linkage 25.

Figure 4:
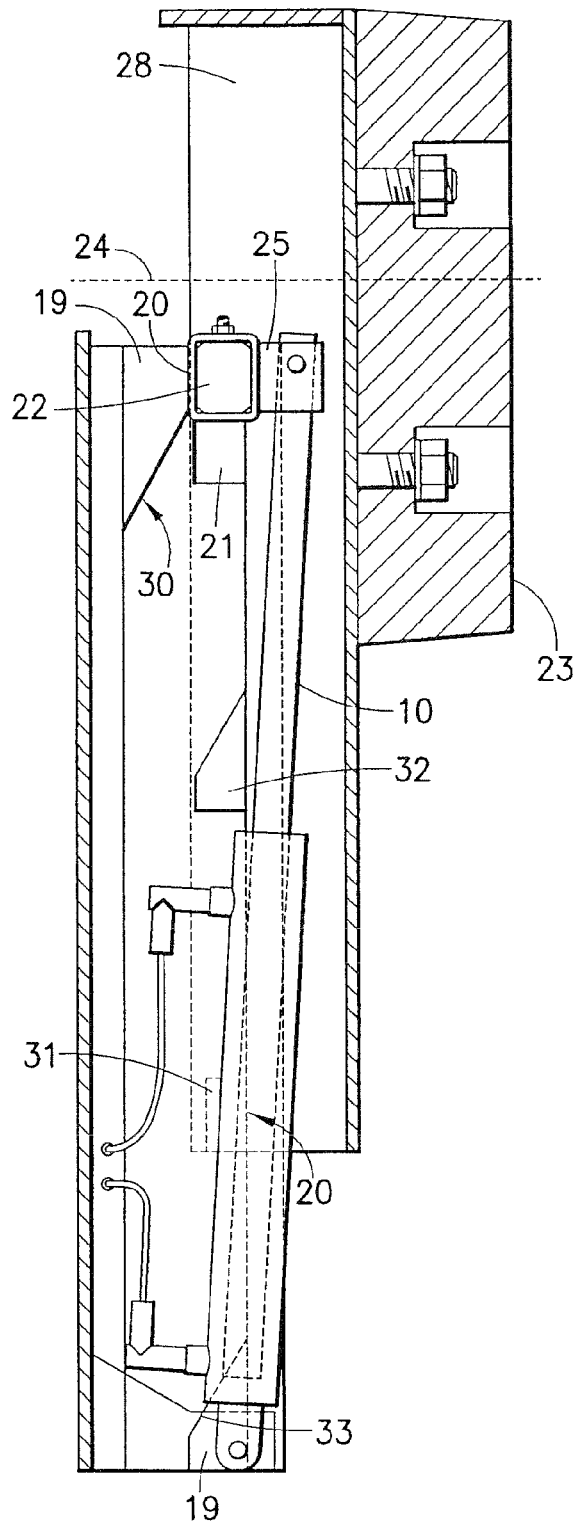

In order to move from the positions shown in FIG. 3 into the docking position according to FIG. 4, cylinder 27 is initially supplied with hydraulic fluid via hydraulic hoses 29. Piston rod 10 then extends outward and moves the carrier element in carrier opening 21 via linkage 25 in a vertical direction until carrier element 22 lies at the upper edge of carrier opening 21. Only then does buffer block 8 also initially move vertically upwards until the carrier element meets incline 30 of guide template 19. Template 19 pushes the carrier element outward until piston rod 10 has reached its upper final position. In this final position, carrier element 22 is supported on supporting surface 20 of template 19.

Because center axis 24 of impact surface 23 is located above carrier element 22, in the event of an impact in the direction of center axis 24, a moment will be exerted on buffer block 8 about the axis of carrier element 22. In order to receive these forces, a torque bracket 31 is provided on buffer block 8, with torque bracket 31 being mounted on an additional vertical supporting surface 20 at a distance from aforementioned supporting surface 20.

The docking buffer is moved from the position shown in FIG. 4 into the position shown in FIG. 3 in a similar fashion. First, carrier element 22 again moves within carrier opening 21. Only then does buffer block 8 move vertically downwards. As soon as carrier element 22 hits incline 32 and torque bracket 31 hits incline 33, then buffer block 8 is pushed accordingly once again in the direction of inclines 32 and 33 on mounting frame 18 until the position shown in FIG. 3 is reached.

Figure 5:
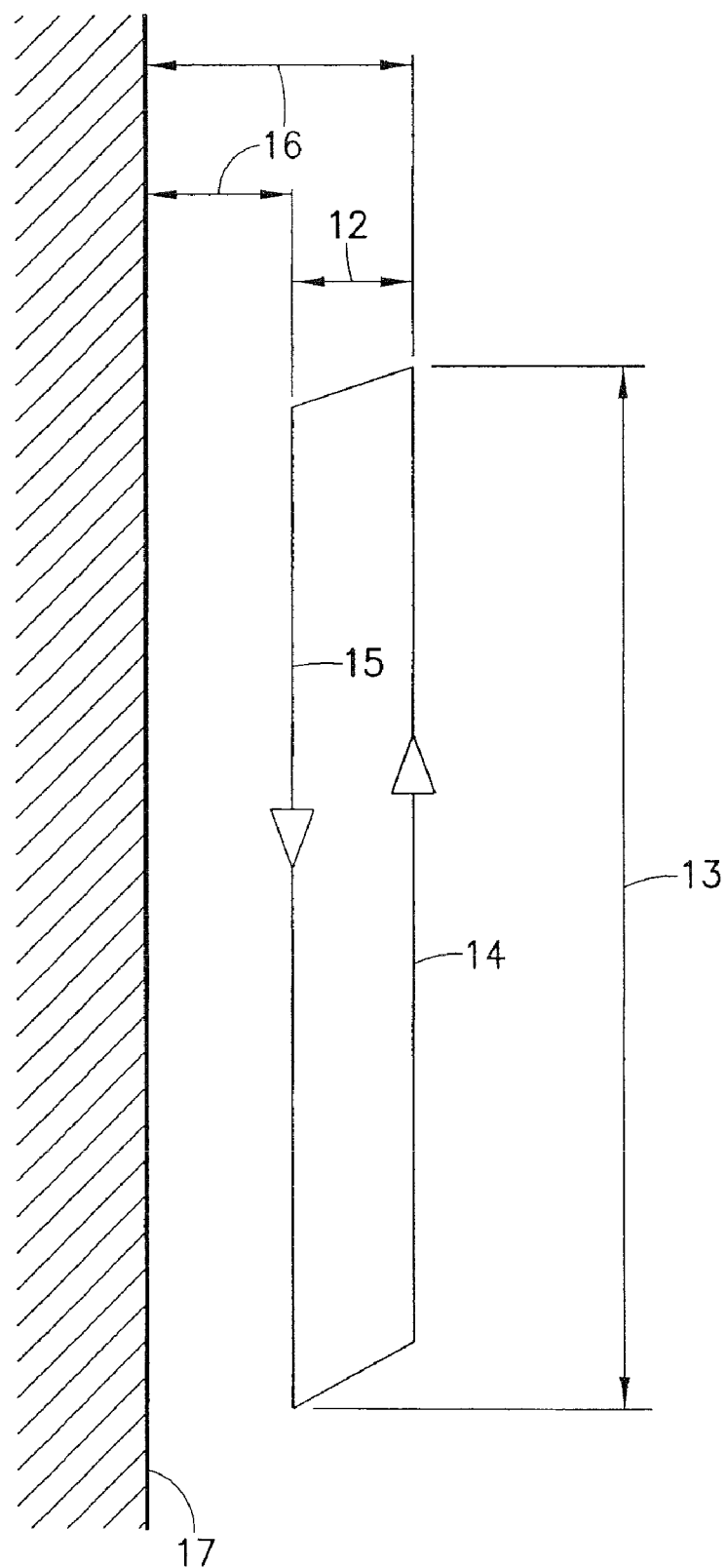

In FIG. 5, the adjustment track is again shown in detail in side view. The upward adjustment track 14 is at a greater distance 16 from staging level 17 of the docking buffer than downward displacement path 15. Horizontal distance regulating component 12, however, is significantly lower than vertical distance regulating component 13. The displacement path can be designed somewhat differently depending upon the means of producing the horizontal distance regulating component. Alternative drive designs are described further below.

Figure 6:
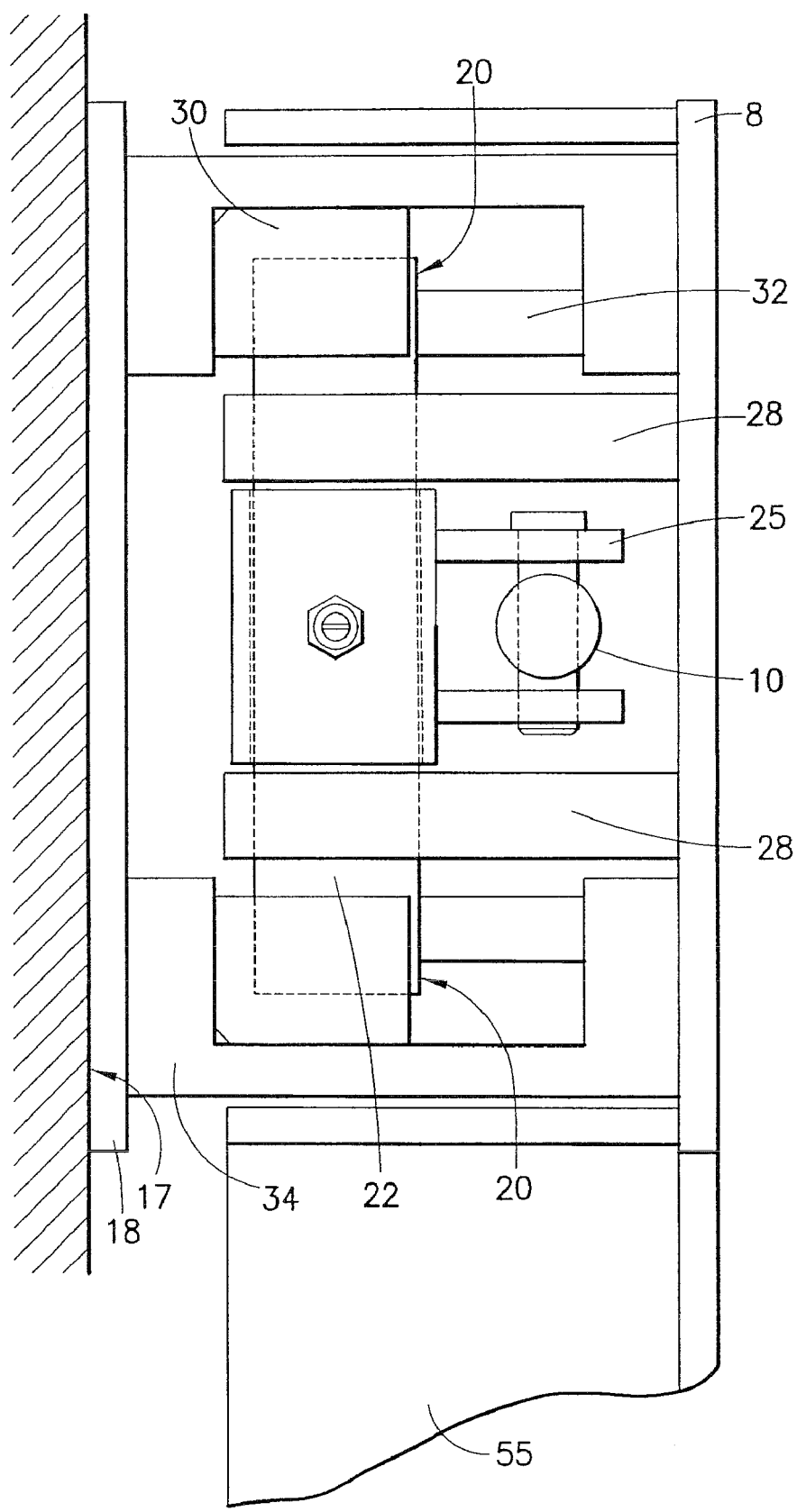

A top view of the docking buffer according to the invention is shown in its lower position in FIG. 6. In this position, buffer block 8 is supported by U-shaped side pieces 34 and mounting frame 18 on staging level 17. In the upper position of docking buffer 1, buffer block 8 is supported via plate 28 and carrier element 22 on supporting surface 20. Buffer blocks 8 are permanently attached to a bumper bar 55, on which docking bumpers are attached at appropriate intervals.

Figure 7:
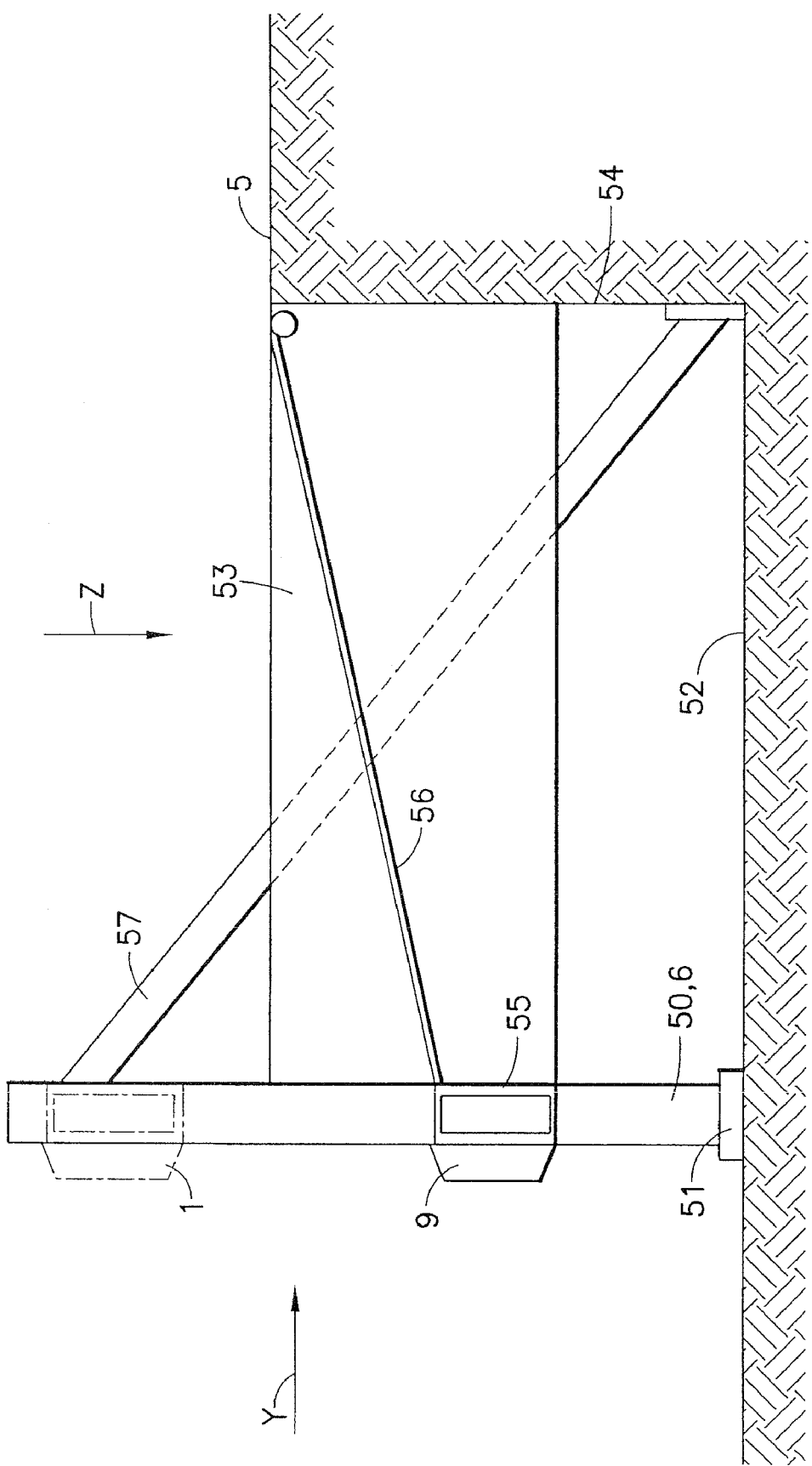
Figure 8:
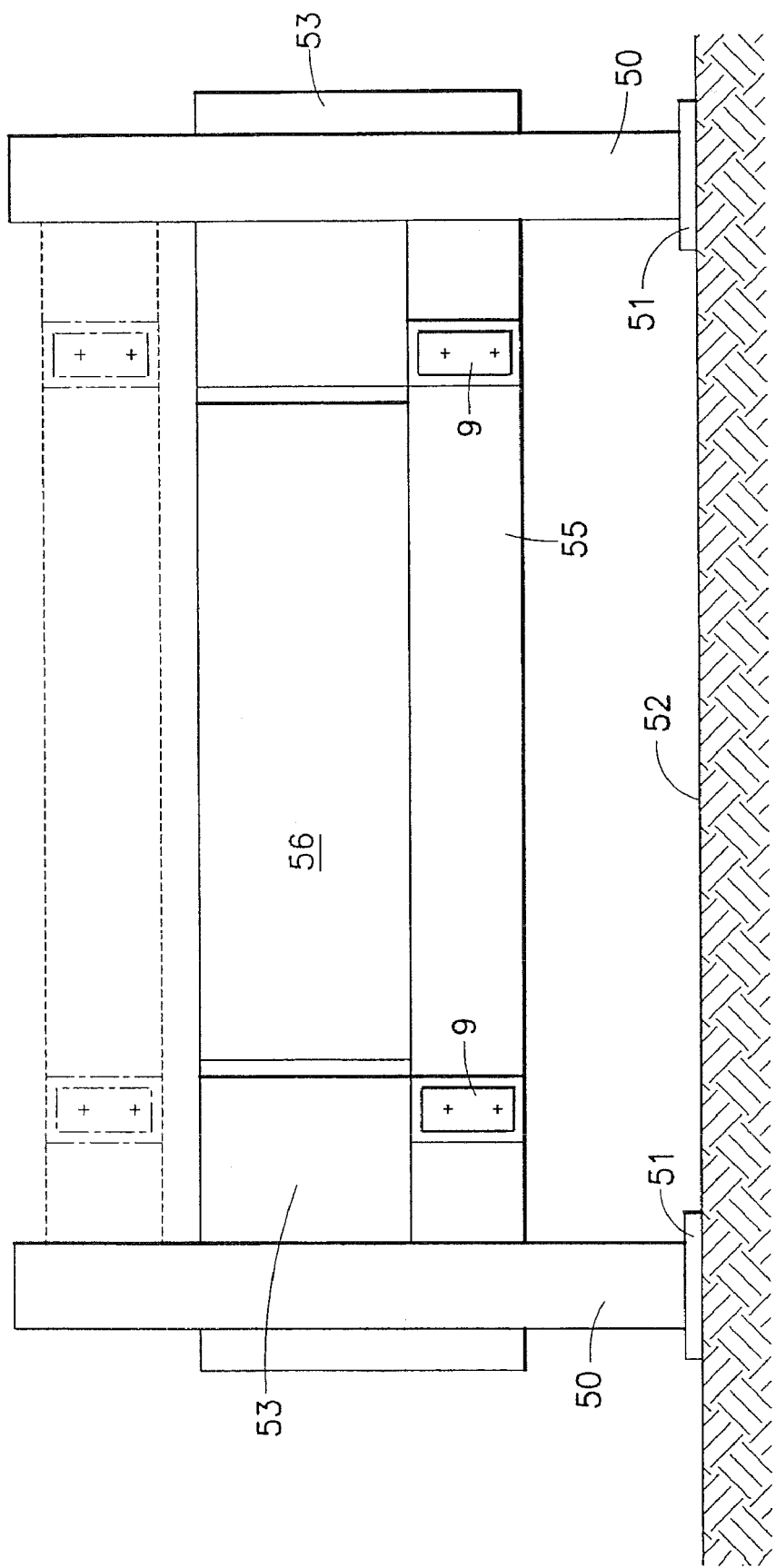
Figure 9:
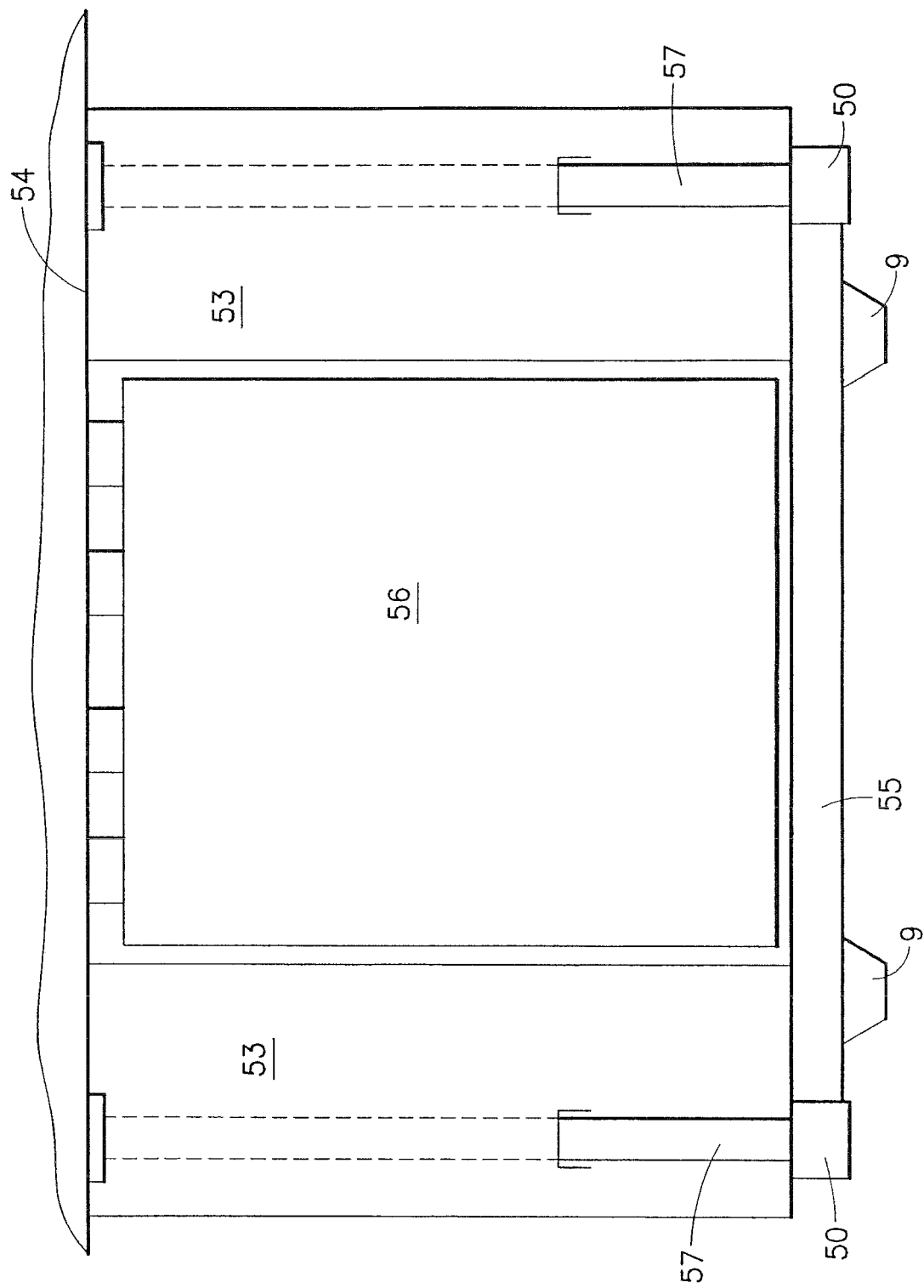
Figure 10A:
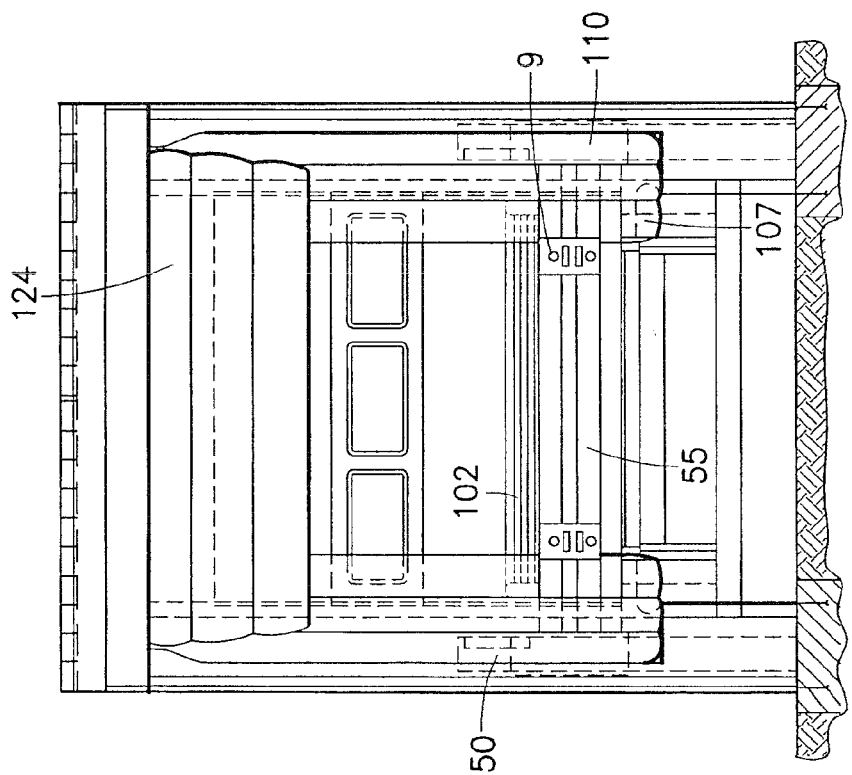
Figure 10B:
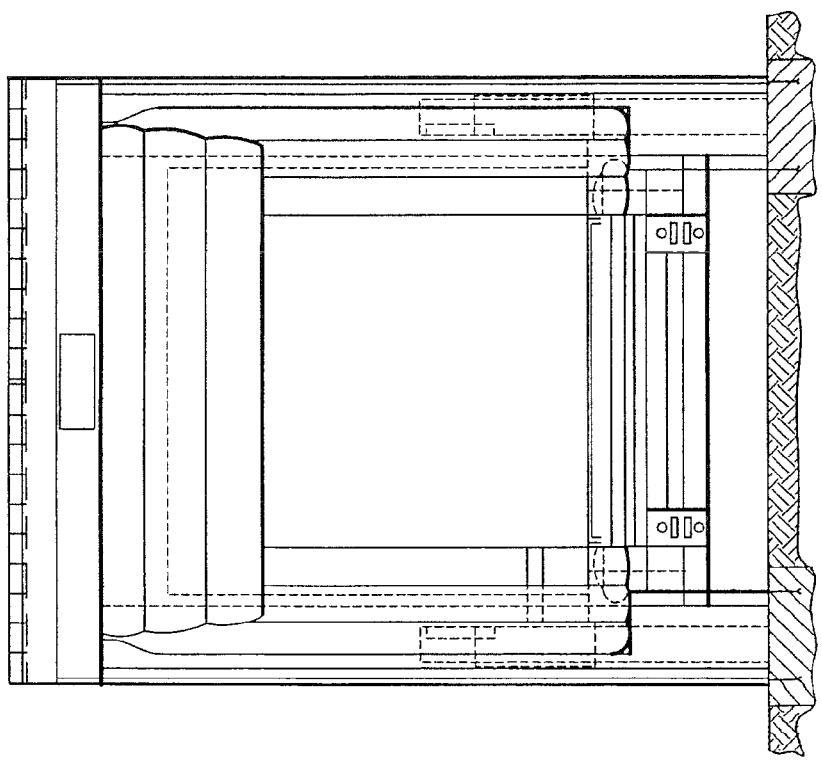

A vertical section, a frontal view and a top view of a preferred embodiment are shown In FIGS. 7, 8 and 9. In order to separate the loading bay from the building, a refrigerated building, for example, a known transfer bridge 56 is mounted in a platform 53. In its resting position, the transfer bridge is set to be inclined downwards. Platform 53 may also be conceived of as redesigned as a thermal lock as is shown in FIGS. 10 through 12. A rollup door, which is not shown for the sake of clarity, may also be lowered to the transfer bridge. In order to protect the door, the transfer bridge and/or platform 53, a bumper bar 55 is located between two supports 50 in front of the platform, two docking bumpers 9 being attached to the bumper bar.

Docking bumpers 9 are arrayed on height-adjustable bumper bar 55 in such a way that they are located on the sides of the transfer bridge. The ends of bumper bar 55 itself are supported height-adjustably in or on pillars 50 in the manner described above. The pillars have a spacing which is preferably double that of the truck width. Pillar 50 is bolted to a pedestal provided in road surface 52 using a flange as foot 51. In addition, the upper end of the pillar is supported from behind against building wall 54 or on the level of the road surface by a supporting beam 57 which is inclined downwards. The impact forces occurring when approaching the structure may thus be conducted into a suitable foundation separated from the platform or from the building structure.

Normally the bumper bar is in its upper resting position when a truck is docked. The transfer bridge is then in its lower resting position. In this position, the bumper bar protects loading equipment such as forklifts located on the transfer bridge from falling off. The door is then opened and the bumper bar is moved into its lower position. The truck door may then be opened without an interfering docking buffer and the platform of the transfer bridge may be raised and placed on the loading surface of the truck. Should the transfer bridge span the entire width of a truck, the bumper bar which is continuous and wider than the overall width of the truck prevents the transfer bridge from being damaged.

The views shown in FIGS. 11 and 12, the frontal view, a vertical section and a horizontal section of a thermal lock, make it evident that the otherwise system-related vertical and horizontal cross-sections of the opening between bridge plate 116 or the building and the vehicle may be substantially reduced or this opening may be entirely closed by the gasket according to the present invention in combination with the docking buffer.

Figure 11A:
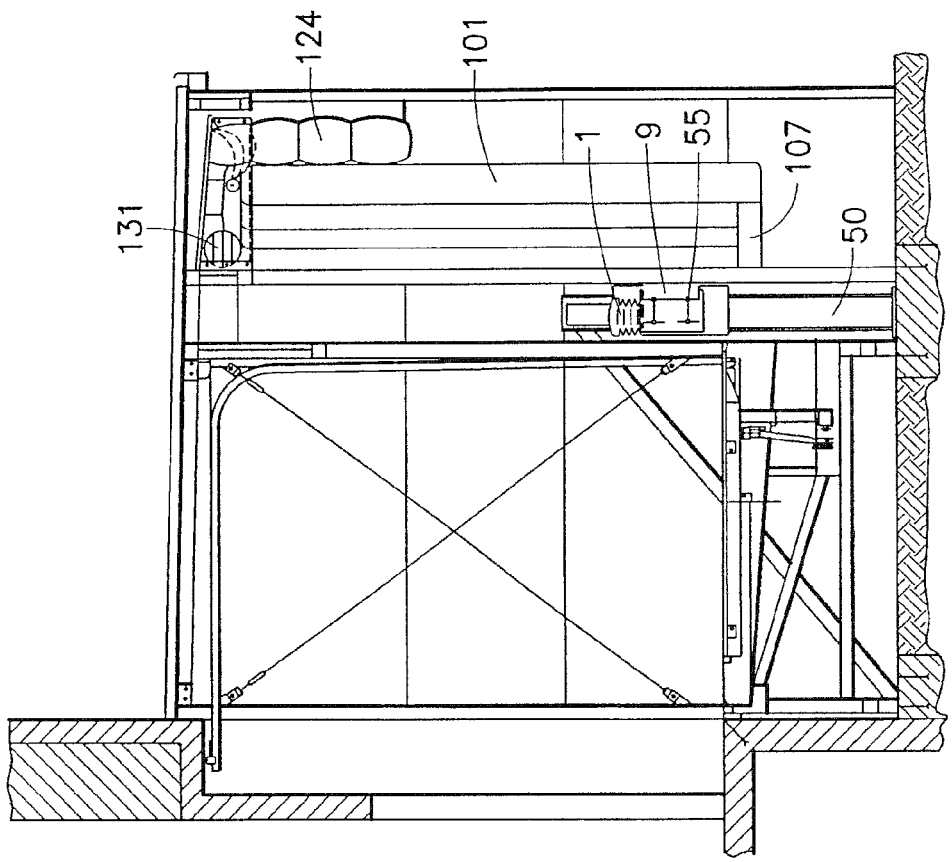
FIGS. 11*a* and 11*b* are side elevational views of the respective FIGS. 10*a* and 10*b*, FIG. 12 the lock according to FIG. 10 in horizontal section, and FIG. 13 a schematic illustration of the blower airflow to the gasket unit according to the invention
Figure 11B:
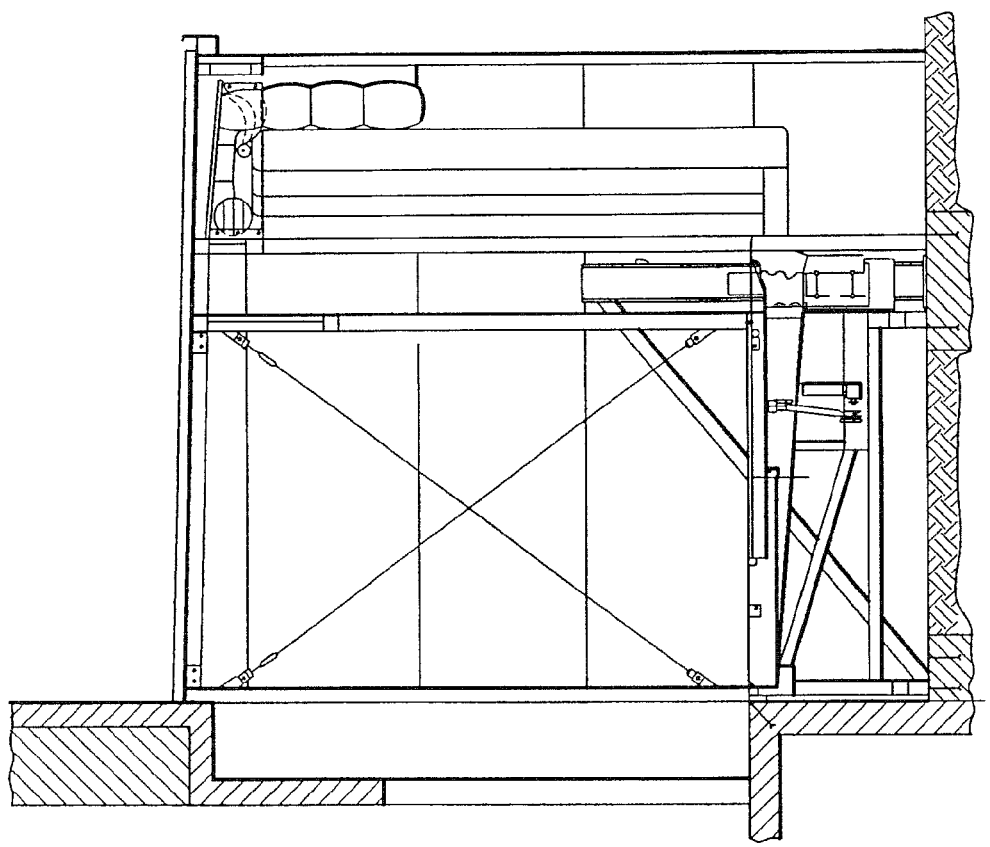
Figure 12:
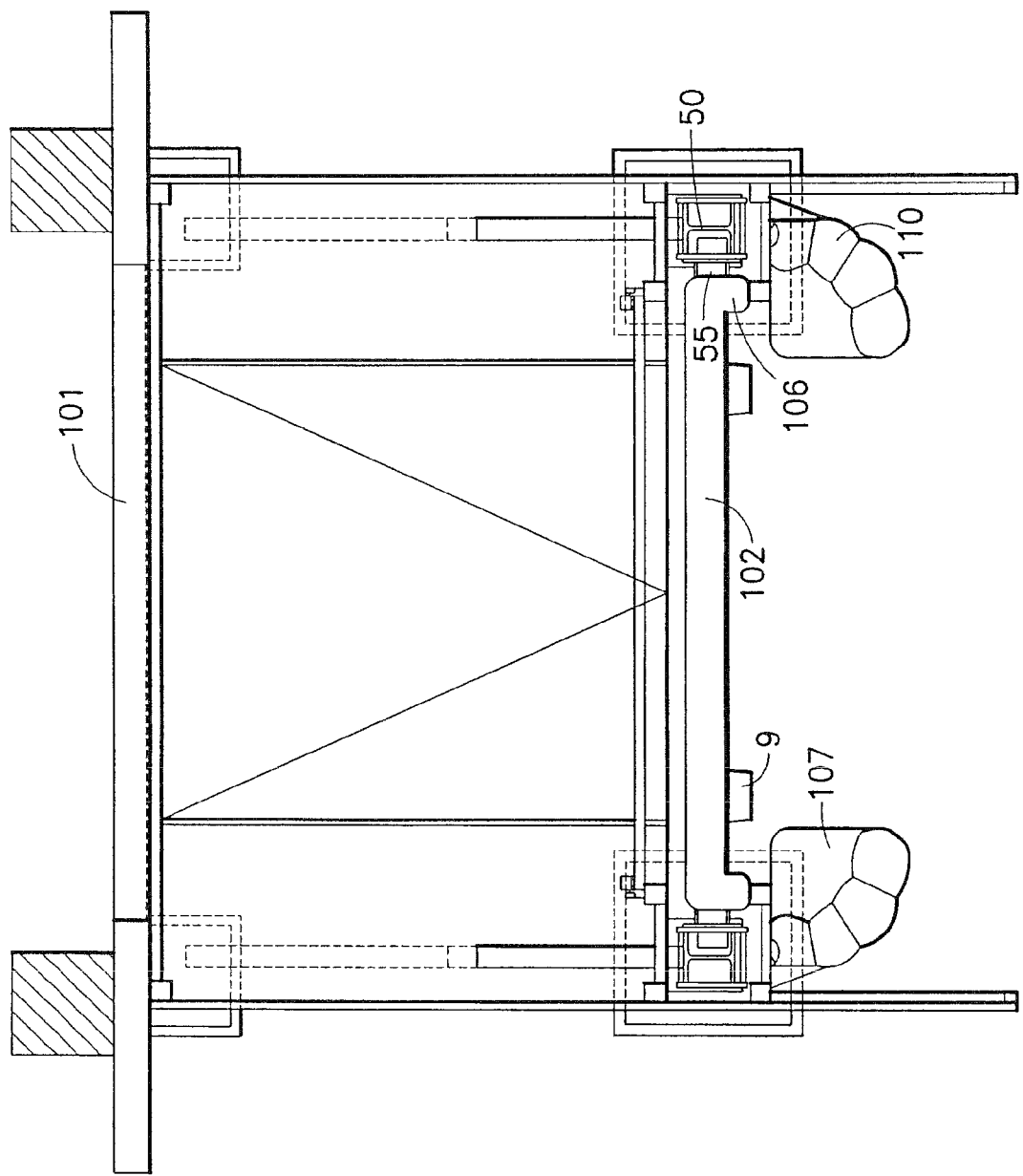

In FIGS. 11a and 11b which show a vertical section through the thermal lock, the horizontally installed IPB beam used as bumper bar 55 may be clearly recognized. Inflatable gasket unit 102 (FIG. 12) is arrayed on it. In this upper safety position of the bumper bar, gasket unit 102 is deflated; a separate blower in the lower position of bumper bar 55 then moves it into its position for sealing the transfer bridge. Inflatable gaskets 124 and 110 arrayed to ides and above the building opening are supplied by blower 131.

FIG. 12 shows the sealing situation as a detail in a horizontal section. It may be seen clearly how, for example, inflatable gasket unit 102 of the present invention has open legs 106 at its ends, the open legs pointing in the direction of a triangular part 107 of laterally inflatable gasket unit 110.

Figure 13:
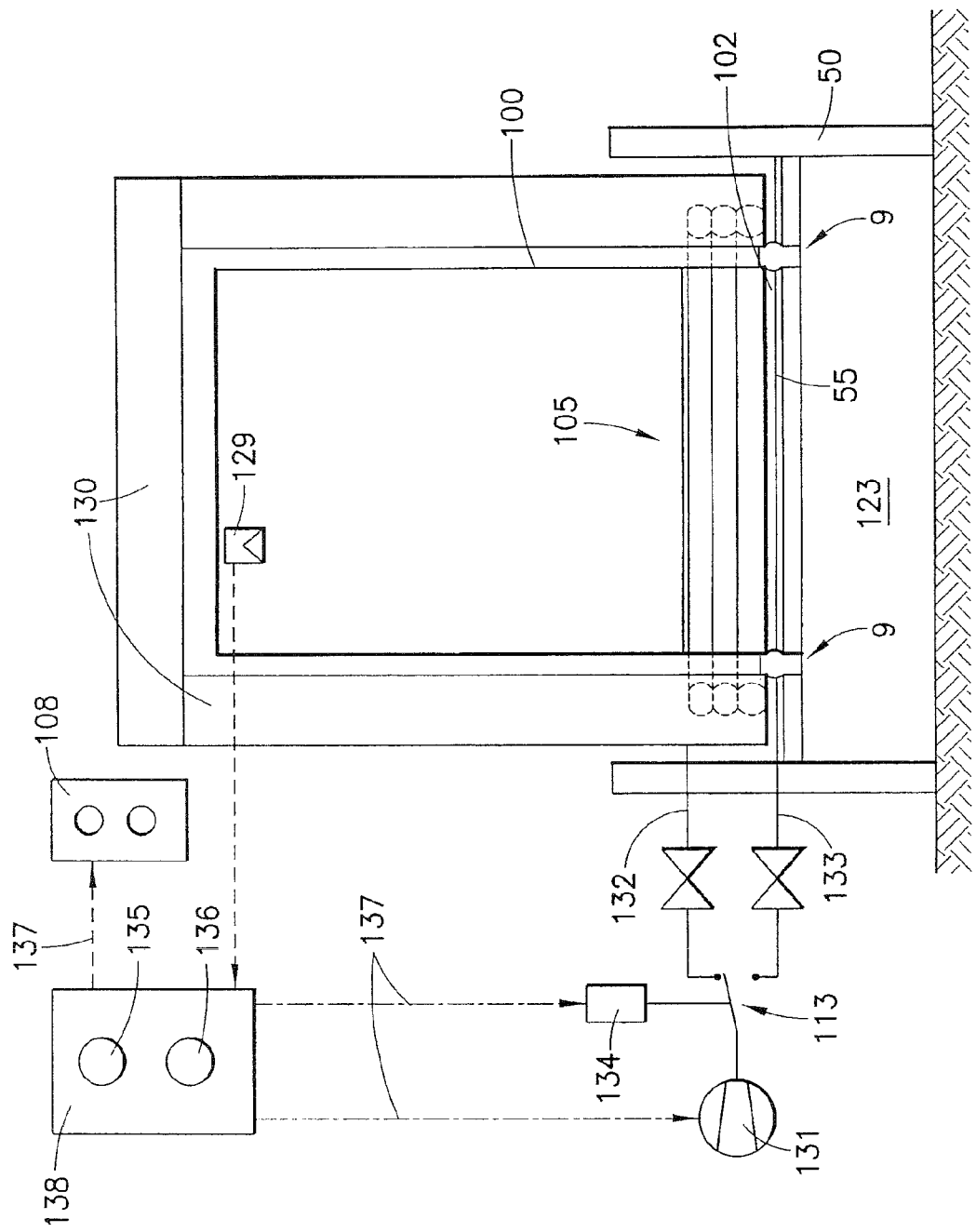

FIG. 13 shows the air supply of the gasket unit schematically. Known inflatable bead gaskets 130 are provided around the sides of building opening 101 and above building opening 100. A blower 131 pressurizes these bead gaskets 130 with air of a proper pressure via an air supply line 132. As a result, they accommodate themselves to the profile of an approaching truck. In addition, inflatable gasket unit 102 is shown above bumper bar 55, which is supplied by a second air supply line 133.

A change-over damper 113 may be used optionally to supply air from blower 131 to bead gasket 130 or to inflatable gasket unit 102 via line 133.

Of course, two blowers assigned to the individual gaskets may be provided as an alternative. A control unit 138 provided for activating the transfer bridge has in addition suitable outputs and active linkages 137 in order to start up blower 131 or alternatively drive 134 of change-over damper 113 or, if necessary, to switch on a signal light 108 that displays the operating state to the driver of a truck via a red or green signal.

If, for example, a truck has approached opening 100, an operator presses button 135 to issue the command to raise the bridge via the control unit. In order to be effective, sensor 129 must first have recognized the docked truck. The control unit then moves bumper bar 55 into its lower resting position; only then does the control unit swing the transfer bridge into its upper position and carries out the lengthening. After the extended condition is reached or after button 135 is released, the extension is lowered onto the loading surface of the truck. Simultaneously, a timer is activated which after 10 seconds, for example, starts blower 131 via active linkage 137 in order to inflate the bead gaskets or gasket unit 102 as a function of the position of the change-over damper.

If after the completion of the loading operation, a person presses button 136 in order to issue the command to return the transfer bridge to its resting position, a timer is again simultaneously activated, which after 10 seconds, for example, gives the command for the bridge. However, pressing button 136 immediately shuts down blower 131 so that the gasket units deflate before the transfer bridge returns to its resting position.

Subsequently, if sensor 129 no longer detects a truck, bumper bar 55 is returned to its upper safety position and after this position is reached signal light 108 is set to green.

This creates a very efficient and operationally reliable docking buffer using a gasket in which the remaining openings between a truck and building are reliably sealed in a previously unattainable manner.

The invention claimed is:

1. A method for operating a docking buffer comprising automatically moving a docking buffer into an upper safety position and moving a transfer bridge to its resting position, and wherein the docking buffer is moved into its upper safety position as soon as the transfer bridge reaches its resting position and a truck is no longer located in a truck docking position; said docking buffer comprises a gasket unit, and said transfer bridge comprises a control unit, and wherein after a command to return the transfer bridge into its resting position and emitting a signal by the control unit to return a gasket unit into its resting position and the transfer bridge then returns to its resting position only after an adequate time interval elapses for the gasket unit gasket to deflate, the gasket unit returning to is resting position as a result of reversing a blower (11).

2. A method for operating a height-adjustable docking buffer for the protection of a building facade when a vehicle is docked at a loading dock, said method comprises positioning the docking buffer inside the building opening adjacent the loading dock, controllably moving the docking buffer upwardly to an upper safety position beyond the building opening for protecting the building facade against the impact of vehicles operating on street level, said docking bumper comprising a fixed mounting frame and a height-adjustable buffer block for a loading ramp or a transfer bridge, wherein the buffer block comprises an essentially horizontal bumper bar (55) having at least one docking buffer (9) having ends which in the area of said ends are height-adjustable by a motor disposed on said mounting frame; said mounting frame comprises pillars mounted on street level outside the building having respective lower and upper ends, and further comprising attaching the lower ends to a fixedly disposed surface; whereby the docking buffer protects the building facade, and prevents a forklift from traversing the loading dock in the docking buffer upper safety position disposed above dock level.

3. The method of claim 2, wherein the bumper bar (55) comprises a gasket, and further comprising positioning the gasket for bridging the gap between the bumper bar and the transfer bridege.

4. The method of claim 2, wherein the bumper bar (55) comprises an adjustment track having both a horizontal (12) and a vertical (13) distance upward and downward regulating component, the upward adjustment track (14) being disposed at a greater distance (16) from a vertical staging level (17) than the downward adjustment track (15).

5. The method of claim 2, wherein the mounting frame (18) is fixedly disposed and comprises a guide template (19), and a movable assembly (7) comprising an adjustable supporting surface, and further comprising means for supporting the supporting surface, the movable assembly (7) comprises the buffer block (8) and one section of a linear drive (10) and the supporting surface being disposed at the buffer block (8),and further comprising the guide template (19) pushing the movable assembly (7) drive outwardly until an upper final position.

6. The method of claim 2, wherein the bumper bar (55) comprises a gasket unit, and further comprising inflating the gasket unit for bridging the gap between the bumper bar and the transfer bridge.

7. The method of claim 2, wherein the bumper bar (55) comprises a gasket, and said method further comprises automatically inflating and deflating the gasket.

8. The method of claim 2, further comprising attaching the upper ends of the pillars to a surface.

9. The method of claim 8, further comprising supporting the upper ends of the pillars by a beam.

10. The method of claim 2, said fixedly disposed surface being at least one selected from a road surface and a building foundation.

11. A method for operating a docking bumper having a height adjustable horizontally disposed buffer block for a loading dock transfer bridge, for protecting a building facade while docking a vehicle operating on street level, said method comprises positioning the docking buffer outside the building facade adjacent the loading dock, controllably moving the buffer block by a motor upwardly to a height extending upwardly from the building facade opening in an upper position adjacent the loading dock as soon as the transfer bridge is disposed in a resting position, whereby the buffer block protects the building facade against impact from vehicles operating on the street level, and also prevents a forklift from falling off the loading dock with the buffer block disposed in the upper position.

12. The method of claim 11, said buffer block comprises a gasket unit, and said method further comprises moving the transfer bridge to an operating position and controllably moving the gasket unit to a sealing position when the transfer bridge is disposed in an operating position.

13. The method of claim 11, further comprising moving the docking buffer from the upper position to a lower position after the vehicle is docked in the building opening.

14. The method of claim 11, further comprising a control unit for controllably moving the buffer block.

15. The method of claim 11, wherein the buffer block is disposed so as to protect the building facade as the vehicle is being docked in the building opening for loading or unloading.

16. A method for operating a docking bumper having a height adjustable horizontally disposed buffer block for operable disposition with respect to a loading dock and a transfer bridge, said method comprises positioning the buffer block outside a building facade adjacent the loading dock, controllably moving the buffer block upwardly by a motor to a an upper position above the level of the loading dock as soon as the transfer bridge is disposed in a resting position, so that the buffer block protects the building facade against impact by a vehicle operating on street level, and further prevents a forklift from falling from the loading dock in the buffer block upper position, and further comprising moving the buffer block by a motor from the upper position to a lower position after the vehicle is docked in front of the transfer bridge, said buffer block comprises a gasket unit, and said method further comprises moving the transfer bridge to an operating position and controllably moving the gasket unit to a sealing position with the transfer bridge disposed in the transfer bridge operating position.

17. A method for operating a docking bumper having a vertically movable horizontally disposed buffer block having a gasket unit, said docking bumper being operably disposed with respect to a building having a facade and a loading dock, and with respect to a transfer bridge movably disposed with respect to the loading dock, said method comprises:
   a) positioning the docking bumper outside the building facade adjacent the loading dock;
   b) controllably moving the buffer block upwardly to an upper position disposed above the loading dock level with the transfer bridge movably disposed in a resting position;
   c) whereby the buffer block in the upper position prevents a vehicle from adversely impacting the building facade and further prevents a forklift from falling off the loading dock; and then
   d) controllably moving the buffer block from the upper position to a lower position after the vehicle is docked adjacent the transfer bridge.

18. The method of claim 17, wherein the buffer block comprises a gasket, and further comprising positioning the gasket for bridging the gap between the buffer block and the transfer bridge.

* * * * *